Sept. 2, 1930.                H. ANDREWES                1,774,822
                         RECTIFIER CHOKE COIL
                         Filed March 21, 1929
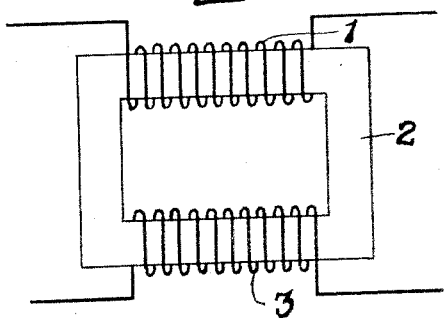
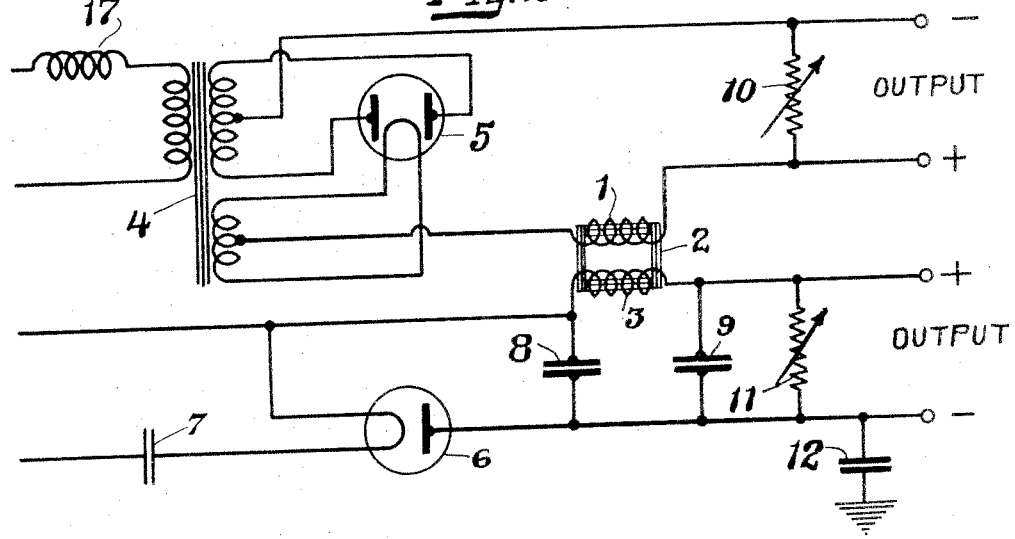
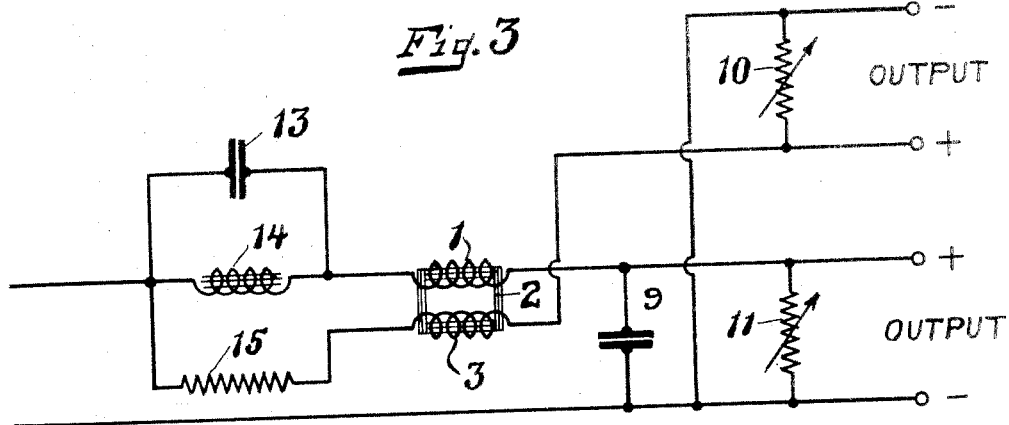
INVENTOR
Humfrey Andrewes.
BY Samuel Ostrolenk
ATTORNEY Patented Sept. 2, 1930

1,774,822

UNITED STATES PATENT OFFICE

HUMFREY ANDREWES, OF LONDON, ENGLAND

RECTIFIER CHOKE COIL

Application filed March 21, 1929, Serial No. 348,829, and in Great Britain March 28, 1928.

This invention relates to an improved smoothing choke for use in battery eliminators.

It is known that in the case of a battery eliminator for supplying low voltage such as that utilized in the filament supply to a radio receiver, a large inductance is required for the smoothing choke, and that as the said choke is to carry a comparatively large current, the mechanical proportions become unmanageable, since in order to prevent saturation a considerable airgap is generally provided in its iron core.

My invention resides in the provision of means in a rectifier circuit for eliminating or reducing the flux in the choke coil produced by direct current component so that a smaller size choke coil may be employed without saturation and omitting the airgap. To this end, two rectifiers are employed fed from a common source of alternating current energy, the output circuits being so arranged that the pulsations in one circuit are out of phase with respect to those in the other. Accordingly, the flux produced by the direct current components annul each other and the inductance coils are left free to provide the necessary inductance or choking actions for the pulsations to eliminate the ripples.

The high tension is here illustrated as it provides the plate supply of a radio set and the low tension as it provides the filament supply. It is evident, of course, that the same system may be applied for other purposes where the two potentials may be equal. As a matter of fact, the two rectifiers may be supplied from a common transformer or in certain cases, even a single rectifier may be used and my choke coil still be applied.

In the present invention, a special choke employing two windings on a common iron core is utilized in which one winding is included in a high tension rectifier system, and the other is included in a low tension rectifier system, in such a manner that the magnetic fluxes set up by the direct currents flowing in the said windings are of opposite sense and therefore cancel each other in this way. Saturation of the iron core is therefore prevented and accordingly, the effective inductance of the two windings is enormously increased in the two rectifier systems, provided that the alternating fluxes set up by pulsations in the rectified current are not in phase.

In the drawings accompanying the specification:—

Fig. 1 shows the choke according to the invention.

Fig. 2 illustrates a preferred arrangement for use with alternating current supply, and Fig. 3 illustrates a preferred arrangement for use with direct current supply.

The arrangement utilized in the choke is shown in Fig. 2 of the drawings. This circuit is a typical low tension rectifier system employing double wave rectification, the rectifying valve 5 being supplied from the transformer 4, one side of the combined choke 1 wound on the iron core 2 in the positive output lead. A single wave rectifier system, such as that employed in my copending U. S. application Serial No. 290,392, is also shown, the filament of the rectifying valve 6 being fed through the condenser 7 with the other winding 3 of the choke 1 in the positive output lead, the usual filter condensers 8 and 9 being connected on either side of the choke. In order that the direct current fluxes set up in the iron core of the choke may cancel each other, the senses and the number of turns of the two windings must be correct, and also the variable resistances 10 and 11 are connected across the two output circuits so that for any given design of choke, the ampere turns in the two windings may be accurately adjusted to be equal and opposite.

By "correct" in the above sentence, it is understood that the windings are wound in such a direction that their magnetizing forces oppose each other and the number of turns are chosen in approximately the inverse ratio to the amount of current flowing through the respective windings. The negative output lead may be earthed if desired through the condenser 12 in the usual manner. If a high tension rectifier system such as that described is utilized, the pulsating E. M. F.'s in the choke will be out of phase as the high tension system is fed through a condenser 7 whereas the low tension system is fed through a transformer possessing certain leakage inductance. If this leakage inductance is insufficient to produce the necessary phase lag, an additional series of inductance 17 may be included in the input lead. If a transformer fed high tension rectifier system is used, the condenser 7 should preferably be retained to provide the necessary phase displacement. The figure shows a half wave high tension rectifier but I do not wish to be limited to this as a full wave rectifier would be also satisfactory in this system.

The rectifiers as shown are merely by way of illustration and may be changed in accordance with the requirements to be either one-half wave or full wave, depending on the particular service.

As is well known, the output of the rectifier circuit contains a number of ripples which can be, in general, considered as a summation of a number of different frequencies, each one a multiple of the supply frequency. Thus, if a phase shift is introduced into the supply frequency, a corresponding multiple of this phase shift will appear in each one of the ripple frequencies. Therefore, by choosing suitably the amount of the phase shift in the supply circuit, the ripple frequencies are shifted in such a manner that their effect on the inductance coil does not cancel out, that is, the inductance coil will be effective in suppressing them.

In Fig. 3, a similar arrangement is shown for use in a direct current supply, which may come from a single rectifier or from a power network. Such supply will, in general, have a certain amount of ripple which must be filtered out before the supply is suitable for use in a radio set. The windings 1 and 3 are similarly connected in the positive output leads, the low tension supply being supplied in this case through the resistance 11. The necessary phase displacement between the two pulsating E. M. F.'s superimposed on the D. C. supply is obtained by including an impedance 14 in the high tension positive lead shunted by a condenser 13. This impedance may be in the form of an inductance or of a resistance, or of a combination of the two. Similar shunting resistances 10 and 11 are used in the output circuit to equalize the two fluxes of direct current choke. The said variable resistances 10 and 11 may be in the form of resistance wire arranged in any well known manner, or of any equivalent resistance material, or when desired, one or both of them may be in the form of gas discharge tubes.

It should be noted that the phase shifts required in the low tension and the high tension branches are not necessarily a large angle. It is only necessary to shift the phases so that the resultant geometric summation of the most important ripple frequency in the two branches of the choke coil, leave an appreciable quantity subject to its inductive effect. Thus, if the double frequency ripple (120 cycles with a 60 cycle supply) is the most important, then a phase advance of 45° in the high tension circuit and phase lag of 45° in the low tension circuit would place the two ripple currents in 180° phase relation. With the sense of winding such that the direct current components cancel each other, these 120 cycle ripple currents will be in phase and subject to the full choking effect of the inductance coil. However, in general a smaller angle than 180° would be also satisfactory.

Having now particularly described and ascertained the nature of my said invention and in what manner the same is to be performed, I declare that what I claim is:—

1. In a rectifying system consisting of at least two independent rectifiers, an output circuit for each of said rectifiers, a common choke coil for said two circuits and means whereby the saturation of said choke coil by the rectified current is prevented.

2. In a system of rectifiers, comprising two separate rectifiers, an output circuit for each of said rectifiers, a choke coil, windings on said choke coil connected respectively in each of said output circuits, means to minimize saturation in said choke coils due to said rectified currents and further means for shifting the phase of alternating currents applied to at least one of said rectifiers to render said choke coil effective in its function.

3. In a system as described in claim 2, said latter means consisting of a condenser in the input circuit of one of said rectifiers and a reactance in the circuit of the other of said rectifiers.

4. In a system as described in claim 1, separate windings on said choke coil respectively connected in each of said circuits, said means consisting of arranging the numbers of turns and the sense of said windings to substatially cancel out the magneto motive force due to said rectified currents.

5. In a system as described in claim 1, separate windings on said choke coil for each of said rectifiers, connections from said windings to said output circuits in such a sense that the magneto motive forces due to said rectified currents are substantially opposed, said means comprising the resistance elements in at least one of said output circuits adjusted to approximate the cancellation of said magneto motive force.

6. In a battery eliminator for furnishing high tension and low tension supplies to a radio receiver, separate rectifiers for each of said supplies, a double wound iron core choke coil, such that the ampere-turns of the two windings are substantially equal, one of said windings being included in the filter circuit of the low tension supply and the other winding being included in the corresponding circuit of the high tension supply so that the magnetic fluxes caused by the two windings on the iron core, are substantially cancelled.

7. Means for furnishing high tension and low tension supplies to a radio receiver from a source of alternating current energy comprising the combination of two rectifier systems, one for each of said supplies, a double wound choke coil, one of said windings being connected respectively in each of said supply circuits, and the number of turns of said windings being arranged to have substantially equal ampere-turns and to be, in a sense, to oppose each other, and means for displacing the phase of the current flowing to one of said rectifying systems relative to that of the current flowing to the second rectifying system.

8. Means for furnishing high tension and low tension supplies to a radio receiver as described in claim 7, said latter means consisting of a condenser in series with one of said rectifying systems for producing said phase displacement.

9. In a rectifying system consisting of at least two rectifiers, an output circuit for each of said rectifiers, a double wound choke coil, each of said windings being respectively connected in each of said output circuits, and arranged with a number of turns and in a sense, to substantially cancel the magneto motive force due to said rectified currents and means for displacing the phase of the disturbing ripple components in at least one of said output circuits relative to that of the other.

10. Means for furnishing at least two supplies to a consuming device comprising separate circuits for each of said supplies, a double wound choke coil with one of the windings in each of said circuits, said windings being arranged to have a number of turns and a sense so that the magneto motive force due to the direct current component of the output currents are substantially cancelled and means for displacing the phase of the disturbing ripple components in at least one of said circuits relative to that of the other supply circuits.

11. Means for furnishing two separate supplies to a consuming device as described in claim 10, wherein said latter means comprises a condenser in at least one of said circuits to advance the phase of the ripple of said circuit.

12. Means for furnishing at least two separate supplies to a consuming device as described in claim 10, wherein a balance of magnetic fluxes in said iron core of the double wound choke coil is secured by adjustable shunt resistance connected across at least one of said circuits.

13. Means for furnishing at least two supplies to a consuming device as described in claim 10, wherein a balance of the magnetic fluxes in the iron core of said double wound choke coil is secured by connecting gas discharge tubes across at least one of said output circuits.

14. In a rectifying system, a first circuit, means for transmitting pulsating currents to said first circuit, a second circuit, means for transmitting pulsating currents to second circuit out of phase with respect to said pulsating currents in said first circuit, a choke device comprising coils, one of said coils being connected to said first circuit and the other coil in said second circuit, said coils being so arranged that the fluxes due to direct current component in said first circuit, are balanced out by direct current component of currents in said second circuit.

HUMFREY ANDREWES.